No. 619,789. Patented Feb. 21, 1899.
F. W. REIMOLD.
BORDER MAKER OR RIDGER.
(Application filed Sept. 10, 1898.)
(No Model.)
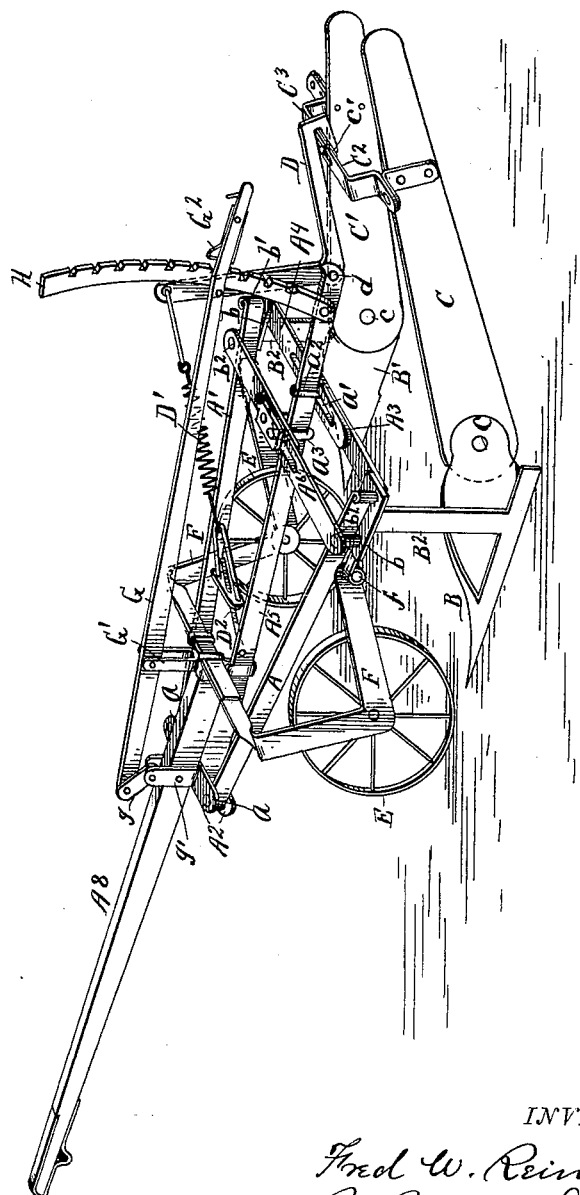
WITNESSES.
O. B. Baenziger.
Mary Hickey.
INVENTOR.
Fred W. Reimold
By Newell S. Wright
His Attorneys.

UNITED STATES PATENT OFFICE.

FRED W. REIMOLD, OF CHIHUAHUA, MEXICO.

BORDER-MAKER OR RIDGER.

SPECIFICATION forming part of Letters Patent No. 619,789, dated February 21, 1899.

Application filed September 10, 1898. Serial No. 690,671. (No model.)

*To all whom it may concern:*

Be it known that I, FRED W. REIMOLD, a citizen of the United States, residing at Chihuahua, State of Chihuahua, Mexico, have invented a certain new and useful Improvement in Border-Makers or Ridgers; and I declare the following to be a full, clear, and exact description of the invention, such as will enable others skilled in the art to which it appertains to make and use the same, reference being had to the accompanying drawing, which forms a part of this specification.

My invention has for its object a border-maker or ridger of novel construction and utility; and it consists of the construction hereinafter described and claimed, and illustrated in the accompanying drawing, illustrating my invention, the drawing being a view in perspective showing my invention. In other words, my invention relates to an implement for making borders or ridges and also adjacent ditches found necessary in sections of the country where agricultural pursuits are carried on by means of irrigation. It is well understood that in such sections of the country for purpose of irrigation it is found desirable to form ridges or borders at certain intervals over the field to be planted or sown, as well as ditches, and my invention aims to provide a machine for accomplishing this work in an expeditious and efficient manner.

As illustrated in the drawing, I carry out my invention as follows: Any suitable framework may be employed, that shown consisting of lateral side bars A A', pivotally connected to front cross-bars A², as indicated at $a$, so that the rear ends of said side bars may be adjustable the one toward the other or the one from the other, as may be required. A⁸ is the tongue. With the rear ends of said side bars are connected two plows B and B', of suitable construction, the one being a right-hand plow and the other a left-hand plow, the two plows being set opposite the one to the other and arranged to turn the ground inward the one toward the other to form an intervening or central ridge. The plow-standards B² are connected with the rear ends of the side portions A A' of the frame in any suitable manner. As shown, said standards are provided at their upper ends with plates $b$, united by cross-braces A³ A⁴, having an adjustable connection the one with the other, the adjacent extremites of said cross-braces being formed with elongated slots $a'$. A longitudinal brace A⁵ is connected with the cross-bars A² at its forward end and is held in engagement with the cross-braces A³ and A⁴, as by a clip $a^2$ passed thereover and extending downward through the elongated slot $a'$, the clip also serving to hold said cross-braces in any given position of adjustment. This brace A⁵ is preferably located at the longitudinal center of the machine. The rear extremities of the side bars A A' may be held in engagement with the plates $b$ in any suitable manner, as by pins $b'$. A⁶ and A⁷ are additional cross-braces having an adjustable engagement the one with the other in a manner similar to the cross-bars A³ and A⁴, and may be engaged upon the plate $b$ by pins $b^2$. A clip $a^3$ unites the brace-arm $a^5$ therewith. The cross-braces A³ A⁴ are preferably located underneath the central brace-arm A⁵, while the cross-braces A⁶ and A⁷ may be located thereabove.

The plows are provided with rearwardly and inwardly projecting wings C C', jointedly connected with the moldboards, as indicated at $c$. These wings converge inward at a desired angle and may be of any desired length. Their jointed connection with the moldboard of the plows enables their rear ends to be raised and lowered according to the height of the border or ridge required, the wings when their rear ends are raised forming the desired shape of the border or ridge, the ridge obviously being wider at the bottom than at the top and gradually narrowing toward the top. The rear ends of the wings are connected by cross-bars C² C³, adjustably connected the one with the other, as shown at $c'$, and are supported by a lever, preferably a bell-crank lever D, engaged with the braces C² C³ in any suitable manner. As shown, the bell-crank lever D may be provided with a hook at its rear end to engage over said braces. These cross-braces C² C³ not only permit the desired adjustment of the wings at their rear ends, but also serve to keep them from spreading. The bell-crank lever D may be fulcrumed to the rear end of the brace A⁵, as indicated at *d*. With the upper end of said bell-crank lever is connected a spring D', which may be regulated to any desired tension to prevent the wings being loaded with earth and also to prevent their dropping to the ground. The forward end of the spring may be engaged by a suitable connecting device D² with the brace A⁵.

The frame is mounted upon wheels E in any suitable manner. As shown, the supporting-arms F are jointedly connected with the forward ends of the plates *b*, as indicated at *f*, and in which the wheels are journaled, the opposite extremities of the arms F being turned upward and inward the one toward the other and having an adjustable engagement the one with the other, as shown. The tongue is connected with the frame at the longitudinal center thereof, so that the draft is taken from said center at the front part of the frame, there being no side draft whatever on the tongue, the tongue being merely used to steady the device and assist in turning the same. The wheels are located to run directly in front of the plows, so that if it is desired to run twice in the same furrow the wheels may run, in the second operation, in the first furrows made, so that the plows will be guided thereby in such a manner that they will cut in the same furrows as before.

G is a lever engaged with the frame at its forward end, as by an intervening link *g* and standard *g'*, said lever being fulcrumed upon a bracket G', which bracket may be engaged with the adjacent ends of the arms F.

H is a ratchet or toothed segment, which may be engaged with the brace A⁵ toward its rear end. The rear end of the lever G is provided with a pawl (indicated at G²) to engage the toothed segment. By means of this lever G the plows may be raised or lowered simultaneously, as may be desired, or lifted entirely out of the ground.

The frame, with the cross-braces, together with the other parts of the structure except the tongue, may all be made of metal, wood being preferably employed only in the formation of the tongue. It will be apparent that by the construction above described the plows may be spread apart or brought closer together, as may be desired, while also, as above set forth, the wings may be spread farther apart or brought closer together, as may be necessary. The different parts of the implement may be made separate, so that one or all of them may be readily replaced by duplicate parts if broken or worn.

The operation of the implement will readily be understood.

The advantages of the implement are also apparent in the amount of work which it may accomplish, together with the superior quality of the work. By the implement ground may be furrowed and at the same time ridged.

What I claim as my invention is—

1. In an implement for the purpose described, the combination of a frame, right and left hand plows connected therewith, inwardly and rearwardly projecting wings jointedly connected at their forward ends with the plows, and a spring attachment connected with the rear extremities of the wings, substantially as set forth.

2. In an implement for the purpose described, the combination of a frame, right and left hand plows provided with inwardly and rearwardly extending wings jointedly connected therewith, and means to laterally adjust the rear extremities of the wings, substantially as set forth.

3. In an implement for the purpose described, the combination of a frame, plows connected therewith, inwardly and rearwardly projecting wings jointedly connected with the plows, means to laterally adjust the rear extremities of the wings, and means to vertically adjust the rear extremities of the wings, substantially as described.

4. In an implement for the purpose described, the combination of a frame, plows connected therewith, inwardly and rearwardly projecting wings connected with said plows, a bell-crank lever connected with the wings, and a spring connected with said lever, substantially as set forth.

5. In an implement for the purpose described, the combination of a laterally-adjustable frame, plows connected therewith, and wheels supporting the frame and made laterally adjustable, said plows provided with inwardly and rearwardly extending wings, substantially as set forth.

6. In an implement for the purpose described, the combination of a frame, wheels supporting the frame, a right and a left hand plow connected with the frame, means to vertically adjust the position of the plows provided with inwardly and rearwardly extending wings jointedly connected with the plows, and a spring attachment engaged with the rear extremities of the wings, substantially as set forth.

7. In an implement for the purpose described, the combination of a frame, vertically and laterally adjustable plows arranged to turn the furrows the one toward the other, and vertically and laterally adjustable wings connected with said plows, substantially as set forth.

In testimony whereof I sign this specification in the presence of two witnesses.

FRED W. REIMOLD.

Witnesses:
J. M. FALOMIR, Jr.,
F. C. FUEHL.